2,981,606
GLUCOSE INDICATOR AND METHOD

Albert S. Keston, Weehawken, N.J., assignor to Eli Lilly and Company, Indianapolis, Ind., a corporation of Indiana No Drawing. Filed June 20, 1955, Ser. No. 516,802

14 Claims. (Cl. 23—230)

This application is a continuation-in-part of and division of my earlier application, Serial No. 424,509, filed April 20, 1954.

This invention relates to diagnostic indicators for indicating the presence of glucose in fluids, and more particularly to an indicator for the detection and estimation of glucose in industrial and body fluids. The invention is especially applicable to determining the presence and amount of glucose in urine and blood for the detection and treatment of diabetics.

Various materials and methods have been known for the detection of diabetics by testing urine for the presence of glucose. Most methods depend upon the reducing action of glucose on the material treated and are based upon heating urine with an alkaline copper or bismuth mixture. The necessary heat may be provided by an external source or be produced by the reaction. The presence and amount of glucose in the urine is indicated by a color change in the reaction mixture. The sensitivity of these methods is, at best, in the order of one part of glucose per thousand parts of fluid which is not enough to detect those small amounts of glucose which may occur in incipient or early diabetes. These prior art methods are complicated by the fact that other reducing substances present may produce a similar and therefore misleading result.

Other glucose detecting methods require complicated and time-consuming manometric procedures or are restricted to operation in the absence of air. These methods are inconvenient and expensive and require skilled technicians for proper operation.

After diabetes is detected, it can be controlled by the regulation of the diet and by the daily administration of insulin. The daily dosage of insulin and regulation of the diet is usually determined by the amount of glucose present in the urine. The various methods which have heretofore been provided for the daily testing of urine have usually employed a kit containing droppers, test tubes, bottles and the like. The necessity for these materials raises the cost of each test and prolongs the time required to complete the test. These tests are particularly inconvenient in the hands of the patient and are subject to the limitations of the prior art methods. In some instances, disagreeable odors are produced.

Therefore, a principal object of the invention is to provide an improved method of and means for detecting the presence of glucose.

Another object of the invention is to provide an improved glucose indicator which will distinguish between glucose and other reducing substances and detect small amounts of glucose in a fluid, and particularly in an aqueous liquid.

A further object of the invention is to provide an inexpensive, quick, convenient and odor-free method of and means for determining the presence and amount of glucose in urine.

An important object of the invention is to provide an indicator in the form of treated paper, such as a paper tape, which will indicate the presence of glucose in a drop of fluid and give a color indication of the amount of glucose present, which amount may easily be determined by the diabetic layman.

An additional object of the invention is to provide a glucose indicator in the form of a reagent requiring only a small quantity of reagent for each test and which will detect the presence of glucose in an amount as small as one part of glucose to more than one hundred thousand parts of liquid.

Other objects and advantages of the invention will appear in the following detailed description and will be apparent to those skilled in the art.

The present invention contemplates in its broader aspects an indicator comprising a glucose enzyme and a substance capable of undergoing a color change with one or more of the compounds formed during the catalytic action of the enzyme upon a reaction involving glucose. The compounds formed during the reaction involving glucose may in turn react with other substances which themselves undergo no or only a slight color change but which react with a color-forming substance to produce a color. More than one substance may mediate between the compounds formed during the reaction and the color-forming substance. Enzymes are biological catalysts and many of them have an unusual specificity for catalyzing a particular reaction with a single, specific and predetermined chemical substance. The glucose enzymes contemplated are those which will catalyze a reaction of glucose when contained in the liquid being tested, thereby producing a predetermined reaction product. The indicating substance shall be one capable of forming a color or changing color in the presence of a reaction product or a mediating substance.

The preferred glucose enzyme intended for catalyzing a reaction of glucose and for use in the indicator of the present invention is glucose oxidase obtained from molds. This catalyst is obtained from such molds as *Aspergillus niger, Penicillium reticulosum, Iridophycus flaccidum* (R. C. Bean et al., "Fed. Proc.," vol. 14, page 179 et seq., March 1955), *Penicillium notatum*, to name a few. The glucose oxidase obtained from *Penicillium notatum* is commonly referred to as "notatin." Glucose oxidases obtained from molds are usually referred to as the flavoprotein type since they contain as a prosthetic group or co-enzyme, a flavin or isoalloxazine. In the case of notatin the flavin is flavin adenine dinucleotide (FAD). The hereinabove described glucose oxidase obtained from molds is to be distinguished from the glucose oxidase obtained from mammals which is a pyridino protein-type enzyme and which catalyzes the transition of glucose to gluconic acid without the concomitant production of hydrogen peroxide.

Glucose oxidase from molds catalyzes the reaction of glucose present in a fluid when the fluid is exposed to the oxygen of the air to produce gluconic acid and hydrogen peroxide. Although I do not wish to be bound by any theory as to how this reaction is catalyzed, I believe that glucose reacts first with the flavin present in the glucose oxidase as a prosthetic group or co-enzyme to produce gluconic acid and reduced flavin (dihydroflavin). The reduced flavin is oxidize by the oxygen in the air back to flavin and hydrogen peroxide is produced. I contemplate incorporating in the indicator a color-forming substance which will be oxidized or reduced by any hydrogen peroxide formed, or reduced by reduced flavin formed, in the fluid medium as a result of reaction between glucose, glucose oxidase and oxygen to produce a colored material or a material of a different color from that of the original substance. The color-forming substance may undergo color change not as a result of direct action of the hydrogen peroxide but may be mediated through another compound which is acted upon by the hydrogen peroxide but which does not itself become highly colored. Examples of such color-forming or color-changing substances are:

(1) Starch and potassium iodide (to produce the characteristic starch-iodine purple).

(2) Potassium iodide (to produce a brown color).

(3) Lead iodide (to produce a brown color).

(4) Mixture of a ferrous salt, such as ferrous ammonium sulfate, and tannic acid (to produce a dark color).

(5) Mixture of a ferrous salt and gallic acid (to produce a dark color).

(6) Mixture of a ferrous salt and pyrogallic acid (to produce a dark color).

(7) Lead sulfide.

(8) Mixture of potassium iodide and ortho-phenylene diamine (to produce a brown color).

(9) Mixture of potassium iodide and alcoholic gum guaiac (forming a blue color).

(10) Mixture of potassium iodide and o-tolidine (forming a blue color).

Starch-potassium iodide and lead sulfide are less satisfactory than the other color-forming agents listed above.

Other color-forming substances which are sensitive to the reduced flavin produced in the test reaction may be employed. For example, a material which changes color upon reduction by the reduced flavin may be employed, such as methylene blue, thionine, sodium 2:6-dichloro benzenone indophenol, sodium 2:6-dibromo benzenone indophenol and brilliant cresyl blue. If glucose is present in the solution being tested, the reduced flavin formed transforms the test solution containing these substances from a blue color to a lighter shade of blue or to a colorless solution. In the use of such a system it is desirable to have catalase present since this enzyme catalyzes the destruction of the hydrogen peroxide which is produced by the enzymatic action of the glucose oxidase of molds on the glucose. This aids in preventing the hydrogen peroxide from interfering with the reduction of the color-changing indicator.

In accordance with the preferred embodiment of the invention, I contemplate a glucose indicator containing a dual enzyme system, one enzyme of which catalyzes the transformation of glucose to produce hydrogen peroxide, the other enzyme having peroxidase activity, said indicator also having present a color-forming substance which is sensitized when hydrogen peroxide is produced when glucose is present.

The preferred glucose indicator of the invention comprises glucose oxidase from molds, and peroxidase or a peroxidase-like substance having peroxidase activity, and a substrate of peroxidase capable of forming color or changing color in the presence of hydrogen peroxide. When this glucose indicator comes into contact with glucose or a material containing glucose, such as the urine of a diabetic, in the presence of air, the glucose is believed to react with the flavin present as a prosthetic group or co-enzyme of glucose oxidase from molds to produce gluconic acid and reduced flavin. The reduced flavin is then believed to react with the oxygen from the air to produce flavin and hydrogen peroxide. The peroxidase then catalyzes the reaction between hydrogen peroxide and the substrate to produce the oxidized form of the substarate. The substarate of peroxidase in accordance with the preferred embodiment of the invention is a substance capable of producing a color or changing color upon being acted upon by hydrogen peroxide in the presence of the peroxidase.

The substrate of peroxidase employed may be either not a color former or not a powerful one but a substance, which when oxidized, will in turn react with a more powerful color former. For example, Example 6 below illustrates this point. More than one substrate of peroxidase may be present in the glucose indicator. For example, sodium iodide may be present with o-phenylene diamine or gum guaiac.

A peroxidase is an enzym which will catalyze a reaction wherein hydrogen peroxide oxidizes another substance. The peroxidases are generally conjugated proteins containing iron porphorin. Peroxidase occurs in horseradish, potatoes, figtree sap and turnips (plant peroxidase); in milk (lacto peroxidase); and in white blood corpuscles (verdo peroxidase). Certain synthetic peroxidases, such as disclosed by Theorell and Maehly in Acta Chem. Scand., vol. 4, pages 422–434 (1950), are also satisfactory. Less satisfactory are such substances as hemin, methemoglobin, oxyhemoglobin, hemoglobin, hemochromogen, alkaline hematin, hemin derivatives, and certain other compounds which demonstrate peroxidative or peroxidase-like activity, namely, the ability to catalyze the oxidation of another substance by means of hydrogen peroxide and other peroxides. The various peroxidases are believed to contain hematin.

Other substances which are not enzymes but which possess peroxidase-like activity are: iron sulfocyanate, iron tannate, ferrous ferrocyanide, chromic salts (such as potassium chromic sulfate) absorbed in silica gel, etc. These substances are not as satisfactory as peroxidase per se.

Catalase is an enzyme which decomposes hydrogen peroxide so that in the preferred embodiments of the invention which depend upon the reaction of hydrogen peroxide to initiate a color-forming reaction, larger amounts of peroxidase may sometimes be necessary if catalase is present. Commercial glucose oxidase may contain catalase. However, by use of sufficient amounts of peroxidase excellent results may be obtained even in the presence of catalase. Under certain limited circumstances catalase may act as a peroxidase towards primary alcohols, such as methanol and ethanol, and nitrites to form aldehydes and nitrates. The resulting aldehydes and nitrates may be used to initiate a color reaction.

Color-forming substrates of peroxidase and peroxidase-like substances which produce a color formation in the presence of hydrogen peroxide and peroxidase which may be employed in the preferred glucose indicator of the present invention include the following substances:

(1) Monoamines, such as aniline and its derivatives, ortho-toluidine, para-toluidine, etc.;

(2) Diamines, such as ortho-phenylenediamine, N,N'-dimethyl-para-phenylenediamine, N,N'-diethyl phenylenediamine, benzidine (which produces a blue or brown color), dianisidine (turns green or brown), etc.;

(3) Phenols, such as phenol per se (producing a yellow color), thymol, ortho-, meta and para-cresols (producing a green-yellow color, a pin color and a milky suspension, respectively), alpha-naphthol (producing a magenta color), beta-naphthol (producing a while precipitate), etc.:

(4) Polyphenols, such as catechol, guaiacol (which forms an orange color), orcinol, pyrogallol (producing a reddish or yellow color), p,p-dihydroxydiphenyl and phloroglucinol;

(5) Aromatic acids, such as salicylic, pyrocatechuic and gallic acids;

(6) Leuco dyes, such as leucomalachite green (to produce malachite green) and leucophenolphthalein (desirably employed in an alkaline medium);

(7) Colored dyes, such as 2,6-dichlorophenolindophenol.

(8) Various biological substances, such as epinephrine, the flavones, tyrosine, dihydroxyphenylalanine (producing an orange-reddish color) and tryptophane; and (9) Other substances, such as gum guaiac, guaiaconic acid, nadi reagent (producing a bluish color) potassium sodium, and other water soluble iodides; and bilirubin (producing a greenish color).

The glucose indicator of the invention may have incorporated therein a suitable phosphate buffer to provide a desired pH. The pH of the indicator is generally not critical and the most desirable pH range will vary somewhat depending upon the glucose enzyme and other components employed in the indicator. However, extremes of low and high pH values are to be avoided.

The glucose indicator of the invention can be in the form of a treated paper, a bottled reagent, a frangible capsule containing the indicator in reagent form, a pill or tablet which may be dropped into water or alcohol or the liquid to be tested for glucose, or a solid alcohol gel containing the reagent. When in pill or tablet form the indicator may contain a heat-generating substance, such as lithium chloride, which provides heat when placed in water, thus accelerating the reaction rate.

A glucose indicator in the form of a paper (or web or other support material) may be produced by treating suitable papers, such as filter paper, or other support member, with the glucose indicator composition in the form of a liquid reagent. The paper may be soaked, immersed in, sprayed or printed with the liquid reagent and the paper thereafter dried by suitable means, such as air drying.

A glucose indicator in the form of treated paper may be stored for considerable periods of time before use and it is, therefore, desirable that the reagents chosen shall not be easily auto-oxidizable in air. It is advisable to protect the test paper from exposure to light. In some cases it may be desirable to keep the test paper moist by sealing it in a moistened condition in moisture repellent packages which are opened only shortly before the test paper is to be used.

The paper or web or other support member may consist of a number of strips, areas or channels with each channel containing a reagent having a different sensitivity toward glucose. The degrees of sensitivity are chosen to give a suitable range of diagnosis so that the least sensitive channel will indicate the concentration of the glucose in the urine. Additionally, by the proper choice of reagents for these strips, areas or channels, different colors may be produced by different concentrations of glucose rather than one color of varying color intensity.

With some test papers it may be desirable to heat the paper somewhat during the test to accelerate the reaction or develop different colors on the paper.

The indicator paper may be treated with a dye of a particular color, such as yellow, so that the color produced by the test reaction is blended with the background color to produce varying tints which correspond to the concentration of glucose present in the liquid being tested. Thus it may be desirable to dye the paper yellow where the test color produced is blue. Varying tints from yellow to green to blue will be produced for varying concentrations of glucose.

When highly precise determinations of glucose concentration are required photoelectric colorimeter or spectrophotometric methods may be employed to determine the color indication.

When determining quantitatively the amount of glucose in a liquid, the colored substance which is produced may be compared with panels of a standard chart of colors produced by known concentrations of glucose employing the same glucose indicator. The colors may also be compared with those produced by the same glucose indicator with liquids having known concentrations of glucose. The intensity of the observed color is proportional to the concentration of the colored substance, which is in turn proportional to the concentration of glucose originally present in the fluid.

The glucose indicator in the form of a liquid reagent can be used with spot plates or in test tubes for the qualitative and quantitative analysis of glucose in urine, blood or other liquids. If spot plates are employed, only a few drops of glucose indicator as required. One or more drops of the liquid to be tested may be placed in the liquid reagent on the spot plate and the color change produced can be compared with a color chart standard. Satisfactory results can be achieved with about 4 drops of reagent and 1 drop of a liquid to be tested. With this ratio, employing the gum guaiac reagent, color changes are noticeable when the fluid contains as little as 1 part of glucose to one hundred thousand parts of liquid.

The glucose indicator of the invention may be employed to detect the presence of and quantity of glucose in a biological fluid, such as urine and blood, including laked or unlaked blood, blood plasma, blood serum and blood filtrates. Blood filtrates of the Somogyi-type are applicable. However, the indicator of the invention is equally applicable to the detection and determination of glucose in non-biological liquids, for example, liquids produced during the manufacture of beer, dried eggs, beverage syrups and the like.

A suitable glucose indicating reagent for the determination of glucose content of blood substances and blood may employ the gum guaiac or phenylenediamine (with or without alpha-naphthol) as the color-forming substance. Tests can be performed at room temperature. The blood filtrates should not contain an excess of protein precipitants which can inhibit the reagents and should be adjusted to a pH value which avoids extremely low or high values and which does not inhibit enzyme activity.

In order more clearly to disclose the nature of the present invention, specific examples illustrating the practice of the invention will hereinafter be described. It should be understood, however, that this is done solely by way of example and is intended neither to delineate the scope of the invention nor limit the ambit of the appended claims.

*Example 1*

This example illustrates the preparation of a treated paper test tape for detecting the presence of and concentration of glucose in a liquid, such as urine.

About 39.1 grams of o-tolidine were mixed with 1660 ml. of 95 percent ethyl alcohol. About 946 ml. of distilled water were added thereto. The acidity of the solution was adjusted to a pH of 4.6 with a 20 percent aqueous formic acid solution. The volume of the solution was then made up to 2840 ml. of distilled water.

About 34 grams of glucose oxidase from a mold (obtained from Takamine Laboratories), 0.34 gram of horseradish peroxidase prepared by the method of Elliott described in "The Biochemical Journal," vol. 26, page 1281 (1932), and 3.46 grams of tartrazine were mixed dry, and then dissolved in 950 ml. of distilled water. The alcoholic solution containing the o-tolidine prepared in accordance with the preceding paragraph was then added to the solution containing the glucose oxidase, which was stirred briskly during the addition. The resulting solution was then applied to filter paper by the immersion of the filter paper into the solution, and the paper was subsequently air-dried. For convenient use, the paper was cut into strips of suitable length which were rolled into rolls and the rolls placed in suitable dispensers. To maintain the paper in condition for use over long periods of time, it must be stored away from light.

The determination of the presence of glucose in an equeous medium by means of the test paper produced in accordance with this example requires only the dipping of the test paper into or the wetting of the paper with the aqueous medium being tested, and the comparison of the color developed on the paper one or two minutes after the paper has been wetted, with a set of standard colors. The standard colors employed are obtained by actual tests, that is, by wetting portions of the test papers with aqueous glucose solutions of known concentrations over the range desired, and then duplicating, as by dyes and mixtures thereof, the color so produced to provide a series of graduated color standards for comparison purposes.

In this example tartrazine is employed as a yellow dye to give a uniformly yellow background color to the test paper. This yellow background permits greater ease in detecting and measuring the intensity of the blue colors formed by the o-tolidine when glucose is present in the aqueous medium tested.

The examples which follow illustrate the preparation of the glucose indicator of the invention in reagent form.

*Example 2*

An aqueous solution of glucose oxidase was prepared by mixing 2 grams of glucose oxidase from molds (obtained from Takamine Laboratories) (3000 units of a glucose oxidase preparation of Takamine Dee O) with 50 ml. of distilled water, then shaking and filtering the resulting solution. About 20 ml. of the filtrate containing about 1200 units of glucose oxidase were set aside for use.

Next a peroxidase extract was prepared by mixing grated horseradish with three volumes of distilled water, filtering the resultant suspension and then adding enough ammonium sulfate to the filtrate to produce a solution containing 90% of the saturation concentration of ammonium sulfate. The protein which was precipitated by the addition of ammonium sulfate was filtered, washed with a 90% saturated aqueous solution of ammonium sulfate and then dissolved in an amount of water equal to about one-third the weight of the horseradish employed. The resulting solution may be dialyzed to remove ammonium sulfate and then heated to 70° C. for a few minutes to destroy enzymes other than peroxidase which may be present, and finally cooled.

Instead of the peroxidase extract produced above, there may be used the horseradish peroxidase referred to in Example I in a concentration of 100 micrograms per ml. of indicator solution.

A solution of gum guaiac in ethanol was prepared by dissolving 2 grams of gum guaiac N.F. in 100 ml. of ethanol and filtering off the insoluble residue which did not dissolve.

A solution was then prepared by taking the following portions of the solutions and extracts prepared above and mixing them:

|  | Ml. |
|---|---|
| Filtrate containing glucose oxidase (containing about 1200 units of glucose oxidase) | 20 |
| Peroxidase extract | 40 |
| Gum guaiac in ethanol | 8 |
| Ethanol | 20 |

The added ethanol serves as a solvent for both the gum guaiac and the colored reaction product obtained from the gum guaiac when a solution containing glucose is added.

When about four drops of the glucose indicator reagent of the example are mixed on a white spot plate with about one drop of an aqueous glucose solution, a concentration of about one part of glucose per one hundred thousand parts of solution can be detected by the blue color which is produced from gum guaiac. It may be desirable to dilute the urine or aqueous glucose solution prior to testing.

*Example 3*

A glucose indicator reagent solution was prepared by mixing the following materials in the stated amounts:

| Filtrate of glucose oxidase (from Example 2) | ml. | 20 |
| Peroxidase extract (from Example 2) | ml. | 40 |
| Ortho-phenylenediamine | grams | 2.4 |
| Ethanol | ml. | 60 |

When an aqueous solution containing glucose was added to this preparation on a spot plate, a brown or black color was obtained indicating the presence of glucose.

In this example, as in Examples 4–7, in place of the peroxidase extract there may be used the same horseradish peroxidase referred to in Example 1 above in a concentration of about 100 micrograms per ml. of indicator solution.

*Example 4*

To the glucose indicator reagent solution of Example 3 was added 0.6 gram of alpha-naphthol. The resulting glucose indicator solution gave a blue color when an aqueous solution containing glucose was added.

*Example 5*

A glucose indicator reagent solution was prepared by mixing the following materials in the stated amounts:

| Filtrate containing glucose oxidase (from Example 2) | ml. | 20 |
| Peroxidase extract (from Example 2) | ml. | 40 |
| Potassium iodide or sodium iodide | grams | 4 |

When an aqueous solution containing glucose was added to the indicator reagent a brown color was produced indicating the oxidation of iodide ion to free iodine.

*Example 6*

To the glucose indicator reagent solution of Example 5 was added 10 ml. of a one percent aqueous starch solution. Preferably the starch solution was added just prior to testing. When an aqueous solution containing glucose was added to the indicator reagent containing the starch, the characteristic starch-iodine blue color was produced.

*Example 7*

A glucose indicator reagent solution was prepared by mixing the following materials in the amounts stated:

|  | Ml. |
|---|---|
| Filtrate containing glucose oxidase (prepared below) | 20 |
| Peroxidase extract (from Example 2) | 40 |
| Gum guaiac in ethanol (prepared below) | 72 |
| Phosphate buffer (pH 6.1–0.5 molar) | 12 |

The filtrate containing the glucose oxidase was prepared by mixing two grams of glucose oxidase from molds (9780 units of glucose oxidase preparation of Takamine Dee O) with 50 ml. of water, shaking the mixture and filtering off the insoluble material.

The gum guaiac solution was prepared by shaking three grams of gum guaiac N.F. with 100 ml. of ninety-nine percent ethanol and filtering off the insoluble residue.

When this indicator solution was mixed with an aqueous solution containing glucose, a blue color was formed.

*Example 8*

The preparation of the glucose indicator reagent solution produced in accordance with Example 7 was repeated but an equal volume of the peroxidase extract described below was employed in place of the peroxidase extract described in Example 2. The resulting indicator also produced a blue color in the presence of glucose.

The peroxidase extract was prepared by mixing 20 milligrams of lactoperoxidase with 40 ml. of distilled water. This lactoperoxidase solution may also contain about 60 milligrams of phenol which performs the function of inhibiting the catalase activity present which will destroy hydrogen peroxide.

From the foregoing, it will be appreciated that the invention has provided an improved method of and means for detecting glucose and distinguishing between glucose and other reducing substances, including carbohydrates. Very minute traces of glucose in a liquid can be detected and measured with accuracy. The test is simple, inexpensive, quick, convenient and odor-free when used to indicate sugar in urine.

As employed in this application, the term "color-forming substances" is intended to include substances which undergo a color change during the test as well as those which are transformed from a colorless condition to one having a color.

The term "substrate" is intended to include those substances for which a reaction with hydrogen peroxide is catalysed by substances having peroxidase-like activity but which are not, strictly speaking, enzymes.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A glucose indicator comprising glucose oxidase of molds, peroxidase and a color-forming substance oxidizable by hydrogen peroxide in the presence of said peroxidase.

2. A glucose indicator as defined by claim 10 wherein the components are affixed to an inert solid support material.

3. A glucose indicator comprising glucose oxidase of molds, peroxidase and o-tolidine.

4. A glucose indicator comprising glucose oxidase of molds, peroxidase and gum guaiac.

5. A glucose indicator comprising glucose oxidase of molds, peroxidase and o-phenylene diamine.

6. A glucose indicator comprising glucose oxidase of molds, peroxidase, o-phenylene diamine and alpha-naphthol.

7. A method of determining the presence of glucose, which comprises bringing the substance to be tested into the presence of a glucose indicator as defined by claim 10.

8. A composition for detecting glucose which comprises glucose oxidase of molds, peroxidase, and, as an indicator which becomes colored when said composition is contacted with a glucose containing material, 2,6-dichlorophenolindophenol in leuco form.

9. A composition for detecting glucose which comprises glucose oxidase of molds, peroxidase, and as an indicator which becomes colored when said composition is contacted with a glucose-containing material, leucomalachite green.

10. A glucose indicator comprising a flavoprotein glucose oxidase, a substance having peroxidase activity, and a color-forming substance oxidizable by hydrogen peroxide in the presence of said substance.

11. A glucose indicator comprising a paper treated with the components recited in claim 1.

12. A glucose indicator comprising a paper treated with glucose oxidase of moles, peroxidase and o-tolidine.

13. A glucose indicator comprising a paper treated with glucose oxidase of moles, peroxidase and gum guaiac.

14. A glucose indicator comprising glucose oxidase of molds, peroxidase and guaiaconic acid.

References Cited in the file of this patent

UNITED STATES PATENTS

| | | |
|---|---|---|
| 1,247,522 | Fisher | Nov. 20, 1917 |
| 2,359,052 | Scharer | Sept. 26, 1944 |
| 2,482,724 | Baker | Sept. 20, 1949 |
| 2,651,592 | Baker | Sept. 8, 1953 |
| 2,671,028 | Clark | Mar. 2, 1954 |

FOREIGN PATENTS

| | | |
|---|---|---|
| 708,996 | Great Britain | May 12, 1954 |

OTHER REFERENCES

Kenten et al.: Biochem. Jour. 46, 1950, article, pp. 67–73, page 68 relied upon.

Sumner et al.: The Enzymes, vol. 1, part 1, page 6.

Sumner et al.: The Enzymes, vol. 2, part 1, page 645.

Andreae, W. A.: Nature, vol. 4463, May 1955.

UNITED STATES PATENT OFFICE
CERTIFICATE OF CORRECTION

Patent No. 2,981,606            April 25, 1961

Albert S. Keston

It is hereby certified that error appears in the above numbered patent requiring correction and that the said Letters Patent should read as corrected below.

Column 2, line 62, for "oxidize" read -- oxidized --; column 3, line 64, for "substarate. The substarate" read -- substrate. The substrate --; column 4, line 3, for "engym" read -- enzyme --; line 23, for "absorbed" read -- adsorbed --; same column 4, line 54, for "while" read -- white --; column 5, line 73, for "as" read -- are --; column 6, line 62, for "equeous" read -- aqueous --; column 10, lines 13 and 15, for "moles", each occurrence, read -- molds --.

Signed and sealed this 3rd day of October 1961.

(SEAL)
Attest:

ERNEST W. SWIDER
Attesting Officer

DAVID L. LADD
Commissioner of Patents
USCOMM-DC